United States Patent [19]

Miltenberger et al.

[11] Patent Number: 5,047,296
[45] Date of Patent: Sep. 10, 1991

[54] COMPOSITE MAGNETIC MATERIAL AND ITS PRODUCTION PROCESS

[75] Inventors: Bernard Miltenberger, Labrede; Jean M. Sajer, Lanton, both of France

[73] Assignee: Commissariat A L'Energie Atomique, Paris, France

[21] Appl. No.: 241,584

[22] Filed: Sep. 8, 1988

[30] Foreign Application Priority Data

Sep. 18, 1987 [FR] France .............................. 87 12971

[51] Int. Cl.$^5$ .............................................. G11B 5/66
[52] U.S. Cl. .................................... 428/694; 428/900; 342/1
[58] Field of Search ...................... 428/694, 900; 342/1

[56] References Cited

U.S. PATENT DOCUMENTS

| | | |
|---|---|---|
| 3,524,173 | 8/1970 | Wolf . |
| 3,540,047 | 11/1970 | Walser et al. ............................ 342/1 |
| 4,174,419 | 11/1979 | Nienart ................................. 428/251 |
| 4,608,297 | 8/1986 | Shimada et al. . |
| 4,766,039 | 8/1988 | Otomo ................................. 360/125 |
| 4,907,114 | 3/1990 | Shiiki et al. ........................... 360/113 |

FOREIGN PATENT DOCUMENTS

411997 11/1966 Switzerland .

Primary Examiner—Merrell C. Cashion, Jr.
Assistant Examiner—Dennis V. Carmen
Attorney, Agent, or Firm—Pearne, Gordon, McCoy & Granger

[57] ABSTRACT

The composite material comprises an alternation of amorphous magnetic material films based on cobalt, niobium and zirconium and electrically insulating material films (4), each magnetic film being formed from several blocks (6) separated from one another by electrically insulating joints (8), the total volume (Vp) occupied by the magnetic blocks and the total volume (Vj) occupied by the insulating joints being such that the ratio (Vp/Vj) varies between 10 and 50. This material can be used in a wide range of applications with electromagnetic fields having a frequency between 50 MHz and several GHz.

11 Claims, 5 Drawing Sheets

COMPOSITE MAGNETIC MATERIAL AND ITS PRODUCTION PROCESS

BACKGROUND OF THE INVENTION

The present invention relates to a composite magnetic material more particularly usable as a microwave absorbing material in the longwave range between 50 MHz and a few GHz.

In the application to microwave absorption, the composite material according to the invention can be particularly used as a coating material or an anechoid or echo-free chamber and as an electromagnetic filter more particularly used in telecommunications, data processing and microwave ovens.

The presently known microwave absorbing materials are in the form of thin films, with a thickness below a few cm, made from dense materials such as ferrite, or from the dispersion of these dense materials in an appropriate organic binder.

In particular, ferrite tiles are commercially available which absorb microwaves between 100 and 1000 MHz, have a thickness of 5 to 15 mm and a high surface density of approximately 20 to 30 kg/m$^2$. There are also charged or filled organic composite materials, such as rubbers charged with ferrites or metals, whose use frequency varies from 5 to 15 GHz, whose thickness varies from 1 to 5 mm and whose high surface density varies from 2 to 15 kg/m$^2$.

Other known microwave absorbing materials are pyramidal structures or alveolar structures having a thickness of several dozen centimeters and a limited surface density between 1 and 5 kg/m$^2$. The latter materials are generally used for equipping echofree chambers for experimental research.

No matter what the nature and application of the known microwave absorbing materials, the weight problem arises. Either the products are thin but dense, or are light but thick. These weight and overall dimensional problems considerably limit the applications of these absorbing materials, each structure or configuration being specific to a particular application. Moreover, their microwave absorption is generally limited to a small wavelength range.

SUMMARY OF THE INVENTION

The present invention relates to a composite magnetic material and to its production process more particularly making it possible to obviate the aforementioned disadvantages. This material can be made in the form of small mass thin films in order to absorb microwaves in a wide frequency range between 50 MHz and a few GHz (approximately 10 GHz).

More specifically, the invention relates to a composite magnetic material characterized in that it comprises an alternation of magnetic material films and electrically insulating material films, each magnetic material film being formed from several magnetic blocks separated from one another by electrically insulating joints, the total volume Vp occupied by the blocks and the total volume Vj occupied by the joints and the insulating films being such that the ratio Vp/Vj varies from 10 to 50.

This composite material can be produced in the form of thin films with a total thickness less than 1 mm which, despite the high density (8 to 9 g/cm$^3$) of the magnetic material alone, leads to a composite material with a surface density between 0.5 and 1 kg/m$^2$. This low surface density makes it possible to cover objects having a random shape, unlike the prior art materials.

The blocks can have any random shape and, in particular, a triangular, square, rectangular, or even circular surface.

According to the invention, the magnetic films can be made from identical or different ferromagnetic materials. This also applies to the insulating films. Moreover, the insulating joints can be made from a material which is the same or different from that forming the insulating films.

Preferably the magnetic materials used are amorphous ferromagnetic materials with a high magnetic permeability, i.e., at least three times greater than the conventional magnetic material for the real permitivity, such as soft iron, alloys of iron and/or nickel, such as permalloy, molybdenum alloys, boron-based or cobalt-based alloys, etc. The latter metallic amorphous compounds have, for a high cobalt, quantity, real $\mu'$ and imaginary $\mu''$ magnetic permeabilities (or magnetic losses) of a very high level, provided that the magnetic moments of the different magnetic films are oriented parallel to the same direction.

The presence of electrically insulating joints between the blocks of magnetic material makes it possible to reduce the electrically conductive character of the composite material according to the invention in the presence of electromagnetic films having a frequency which can extend up to a few GHz and, therefore, use said material for absorbing microwaves. In this frequency range, the magnetic compound alone has a conductivity between $10^5$ and $10^6$ ohms$^{-1}$m$^{-1}$, whereas the composite material according to the invention only has a conductivity of a few ohms$^{-1}$m$^{-1}$.

As a result of the high conductivity of the magnetic compound alone, the use thickness of this compound must be less than skin thickness, so that each magnetic film assembly (magnetic material plus joints) participates in the microwave absorption. This leads to the use of magnetic films, whose thickness is between 200 and 400 nm.

The choice of the ratio Vp/Vj has been determined in such a way as to retain the maximum of magnetic properties in the composite material, while giving it electrically insulating properties for electromagnetic fields, whose frequency is between 50 MHz and a few GHz.

The amorphous magnetic materials usable in the invention are preferably cobalt-based ferromagnetic materials containing at least one element chosen from among zirconium or niobium, such as materials of types $Co_xNb_yZr_z$ with x ranging between 80 and 95 and, for example, from 87 to 93 and y+z equalling 100−x, in which y and z can in each case assume all integral or non-integral values from 20 to 0.

Usable magnetic materials are $Co_{87}Zr_5Nb_8$, $Co_{87}Nb_{11.5}Zr_{1.5}$, $Co_{89}Nb_{6.5}Zr_{4.5}$, $Co_{89}Zr_{11}$ and $Co_{93}Zr_7$. These materials can be in the form of square based blocks of side L, separated by insulating joints of length $\iota$, with $\iota/L$ being between $10^{-2}$ and $10^{-4}$. L can, for example, vary between 0.5 and 5 mm.

As electrically insulating materials constituting the insulating joints and insulating layers reference can be made to quartz, glass, silica, amorphous silicon, alumina, silicon nitride and zinc sulphide. Preferably, use is made of a layer of air or mixed oxides of Co, Nb and/or Zr for constituting the joints and $SiO_2$ for constituting the insulating films placed between two magnetic films.

The thickness of the insulating films is between 10 mm and 10 μm.

In the application to microwave absorption, the number of magnetic material and insulating material films arranged in an alternating manner is a function of the frequency of the electromagnetic field which it is wished to absorb. As a rule, the higher the frequency to be absorbed, the smaller the number of films. The thickness of the joints can also be used in regulating the absorption frequency.

The invention also relates to a process for the production of a composite magnetic material as described hereinbefore. This process is characterized in that it comprises the following stages:

at least one stage of depositing a magnetic material film on an electrically insulating material film, at least one stage of cutting the magnetic film in order to form in said magnetic film separate magnetic blocks, or at least one stage of producing insulating joints in said magnetic film, at least one stage of orienting the magnetic moments of the blocks of the magnetic film in the same direction parallel to the plane of the magnetic film.

The word "cutting" must be understood in its widest sense and can, in particular, correspond to etching.

The insulating joints between the blocks can be directly formed by an air layer during the cutting of the magnetic film, by filling the cutting line with an insulating material ($SiO_2$, $Si_3N_4$, AlN, ZnS, plastics material.) or by oxidation of the magnetic material, etc. in the mass.

The orientation of the magnetic moments of the atoms constituting the magnetic blocks, all in the same direction for the same magnetic film, makes it possible to obtain a magnetic material with high real and imaginary permeabilities. This orientation is effected before or after producing the magnetic blocks and, in particular, when subjecting the magnetic material to a heat treatment in the presence of a magnetic field oriented parallel to the plane of the magnetic films.

According to a preferred embodiment of the process according to the invention, the following successive stages are performed:

(a) deposition of a first amorphous magnetic material film on a first insulating material film, (b) formation in the first magnetic film of magnetic strips which are parallel to a first direction, (c) deposition on the structure obtained in (b) of a second insulating material film, (d) deposition on the second insulating film of a second amorphous magnetic material film, (e) formation in the second magnetic film of magnetic strips, which are parallel to a second direction perpendicular to the first direction, (f) deposition on the structure obtained in (e) of a third insulating material film and then repeating stages (a) to (e) for the number of times necessary, (g) heat treatment of the structure obtained in (f) in the presence of a magnetic field rotating in the plane of the films, (h) treatment of the structure obtained in (g) in order to form separate magnetic blocks in each magnetic film.

Stage (g) makes it possible to orient the magnetic moments of each magnetic film in the direction associated with the largest dimension of the strips, i.e. in the first direction for the first magnetic film and in the second direction for the second magnetic film, because said position is the most stable from the energy standpoint.

Thus, prior to performing stage (h), planes of magnetic materials are obtained, whereof the magnetization direction rotates by 90° between the individual films. In addition, stage (g) makes it possible to avoid any critical behavior of the composite magnetic - insulating material according to the invention.

In particular, the heat treatment under a magnetic field permits an isotropic behavior of the composite material with respect to the polarization of the wave to be absorbed.

The magnetic blocks can be produced by cutting magnetic films with the aid of an electron or laser beam, by mechanical cutting, or by lithography the etching stage of the magnetic films being produced in the dry or wet phase.

Preferably, the formation of the blocks in stage (h) consists of laser cutting of the stack of magnetic films and insulating films.

According to a variant of the inventive process, several stacks of insulating films and magnetic films are formed, said stacks are assembled and the magnetic moments of the blocks are oriented, each stack being obtained by depositing a first and a second magnetic material films on either side of an insulating support, cutting magnetic blocks in the two magnetic films and depositing first and second insulating films respectively on the first and second magnetic films.

BRIEF DESCRIPTION OF THE DRAWINGS

Other features and advantages of the invention can be gathered from the following illustrative and non-limitative description with reference to the attached drawings, wherein show.

DETAILED DESCRIPTION OF THE PREFERRED EMBODIMENT

Figure 1:
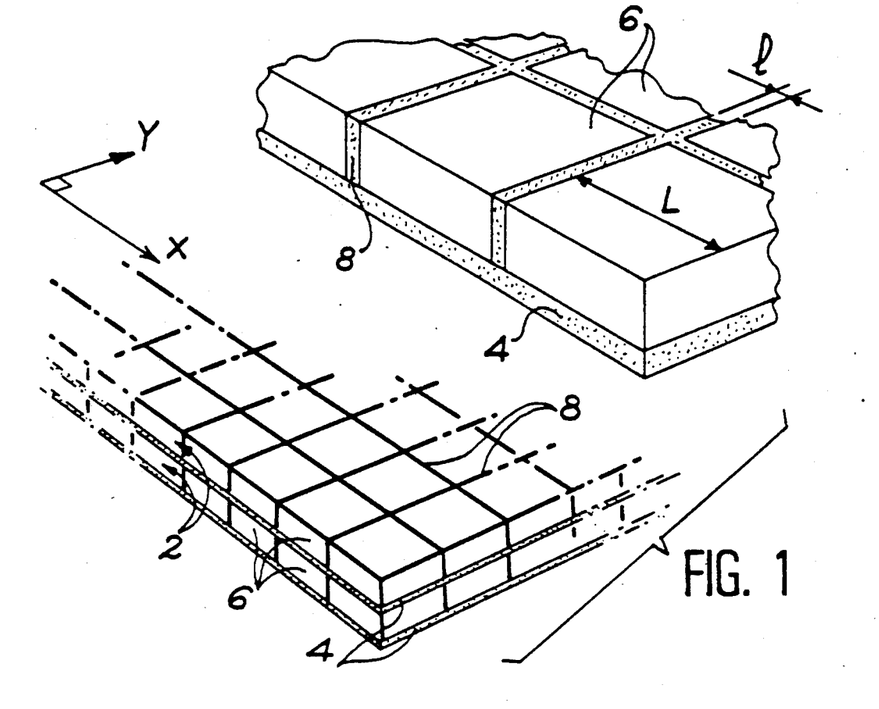
FIG. 1—Diagrammatically and in perspective view a first embodiment of the composite material according to the invention.

As shown in part a of FIG. 1, the composite material according to the invention comprises several amorphous magnetic material films 2 and several electrically insulating material films 4, films 2 and 4 alternating. The magnetic films 2 are formed from square-based, parallelipipedic blocks 6, which are separated from one another by insulating joints 8. The magnetic moments of blocks 6 of the same magnetic film 4 are all oriented in the same direction contained in the plane XY of the films.

Blocks 6 are in particular made from $Co_{87}Nb_{11.5}Zr_{1.5}$. They have a length L of 1000 μm and a thickness of 200 nm (part b). The joints separating the blocks 6 have a width ι of 10 μm. They are in particular made from $SiO_2$ or a mixed oxide of Co and Zr and possibly Nb. The insulating films 4 are made from $SiO_2$ and have a thickness of 10 nm.

According to the invention the ratio ι/L is close to $10^{-3}$ and consequently the ratio Vp/Vj is close to 20, Vp and Vj respectively representing the total volume occupied by the blocks and the total volume occupied by the insulating joints and films.

Figure 2:
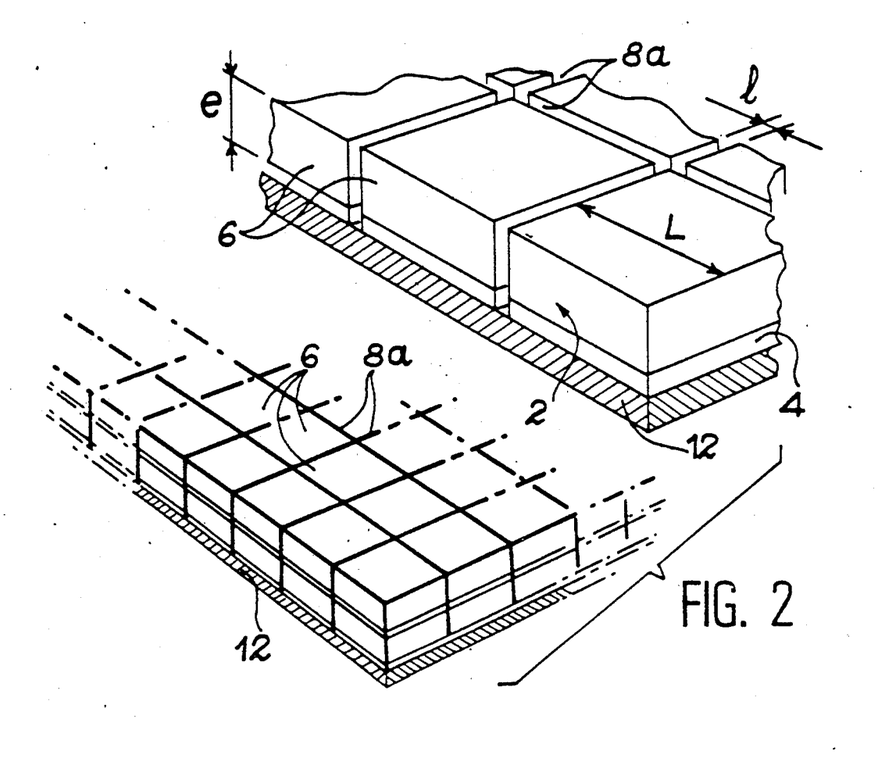
FIG. 2—Diagrammatically and in perspective view a second embodiment of the composite material according to the invention.

It is also possible to use as the insulating joint an air layer 8a, as shown in FIG. 2, whose width is ι and whose thickness e (part b) are respectively equal to those of the magnetic blocks 6. Moreover, the insulating films 4 separating two magnetic films 2 must not be in the form of a continuous film and must be constituted by blocks 10. Each insulating block 10 faces a magnetic block 6 and has the same surface dimensions as the latter.

In this case, in order to ensure rigidity and cohesion of the composite material according to the invention, an insulating or conductive material support 12 must be provided on the lower face of the composite material. Material 12 is in particular constituted by a layer of silica, glass or steel, whose thickness is a function of the desired rigidity.

The composite material, as shown in FIGS. 1 and 2, can be used as a material for absorbing microwaves in a frequency range between 50 MHz and a few GHz. It can be used as a coating material and has a surface density at the most equal to 1 kg/m². These absorption performances locally reach −20 to −30 dB.

The number of magnetic films 2 constituting the composite material according to the invention is a function of the frequency of the electromagnetic field which it is wished to absorb. The following table gives an example of the number of magnetic films N to be used as a function of the electromagnetic frequency which it is wished to absorb. This table relates to 200 nm thick films 4 formed from blocks of $Co_{87}Nb_{11.5}Zr_{1.5}$ of 1×1 mm², separated by a 10 μm thick air-layer, the magnetic films being separated from one another by 10 nm $SiO_2$ insulating films 4. In this table $e_T$ represents the total thickness of the composite material.

TABLE

| Operating Frequency | N | $e_T$ (μm) |
|---|---|---|
| 500 MHz | 2400 | = 600 |
| 1 GHz | 380 | = 100 |
| 2 GHz | 280 | = 70 |

The use of a ratio Vp/Vj between 10 and 50 makes it possible to obtain a composite material having magnetic materials only differing slightly from those of a corresponding thin, integral magnetic material. In particular, the real μ' and imaginary μ" magnetic permeabilities of a composite material according to the invention remain high and their variations as a function of the frequency of the exciting electromagnetic field are similar to those of the integral material.

Figure 3:
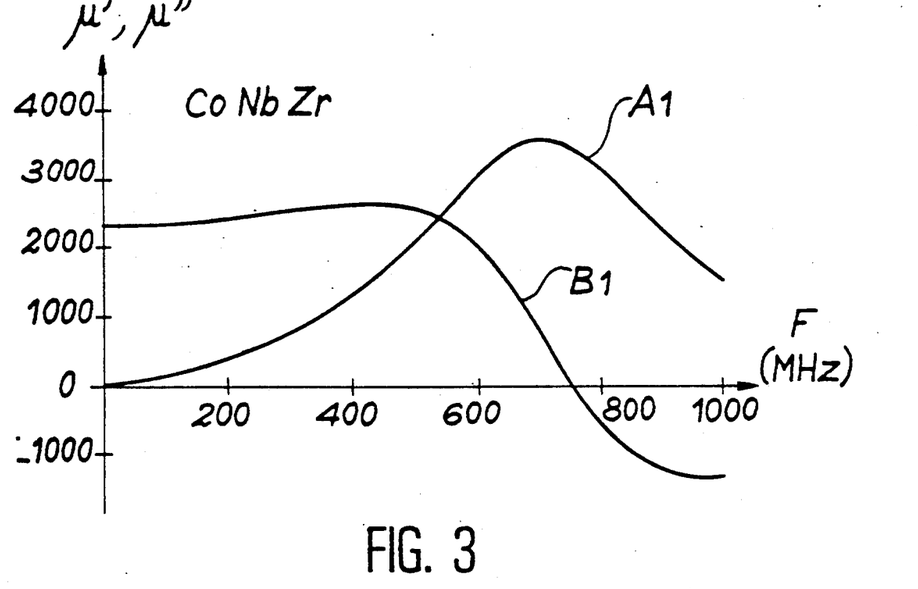
FIG. 3—Variations of the real $\mu'$ and imaginary $\mu''$ magnetic permeabilities of a continuous film of $Co_{87}Nb_{11.5}Zr_{1.5}$ with a thickness of 200 nm as a function of the frequency F of an electromagnetic field applied to the film.
Figure 4:
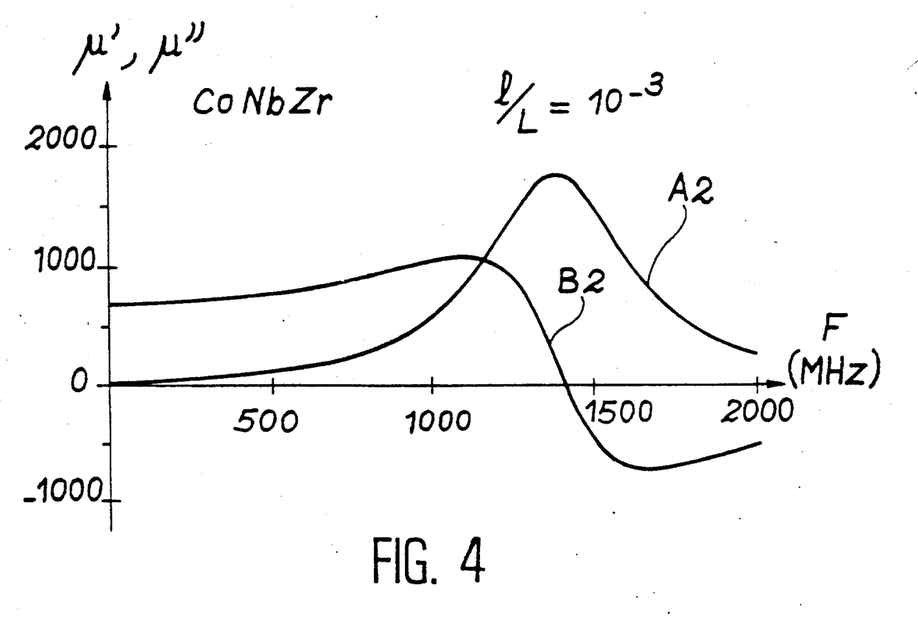
FIG. 4—The variations of the real $\mu'$ and imaginary $\mu''$ magnetic permeabilities of a film of $Co_{87}Nb_{11.5}Zr_{1.5}$ with a thickness of 200 nm and cut into blocks according to the invention, as a function of the frequency F of an electromagnetic field applied to said film.

This can be clearly gathered from FIGS. 3 and 4, which give the variations of the real and imaginary magnetic permeability of a 200 nm thick film of $Co_{87}Nb_{11.5}Zr_{1.5}$, respectively continuous and formed from blocks with ι/L = $10^{-3}$, as a function of the frequency of an exciting electromagnetic field. Curves $A_1$ and $A_2$ respectively give the imaginary magnetic permeability μ" of a solid thin magnetic film and a magnetic film in the form of blocks and curves $B_1$ and $B_2$ respectively correspond to the real magnetic permeabilities μ' of a thin solid film and a film in the form of blocks.

Although the use of magnetic blocks separated by insulating joints only very slightly modifies the magnetic properties of the amorphous magnetic material, this is not the case with regard to its electrical properties.

In particular, the electrical conductivity of a composite material according to the invention does not exceed 20 $ohms^{-1} \cdot m^{-1}$, which corresponds to the range of insulating materials, whereas the corresponding solid magnetic material has an electrical conductivity of $10^5$ $ohm^{-1}m^{-1}$, which corresponds to the range of electrically conductive materials. These values are for a material of type CoNbZr with a cobalt quantity representing at least 80% of the atoms of the material. Moreover, the imaginary electrical permitivity of the material according to the invention is relatively low and remains constant up to 20 GHz.

Figure 5:
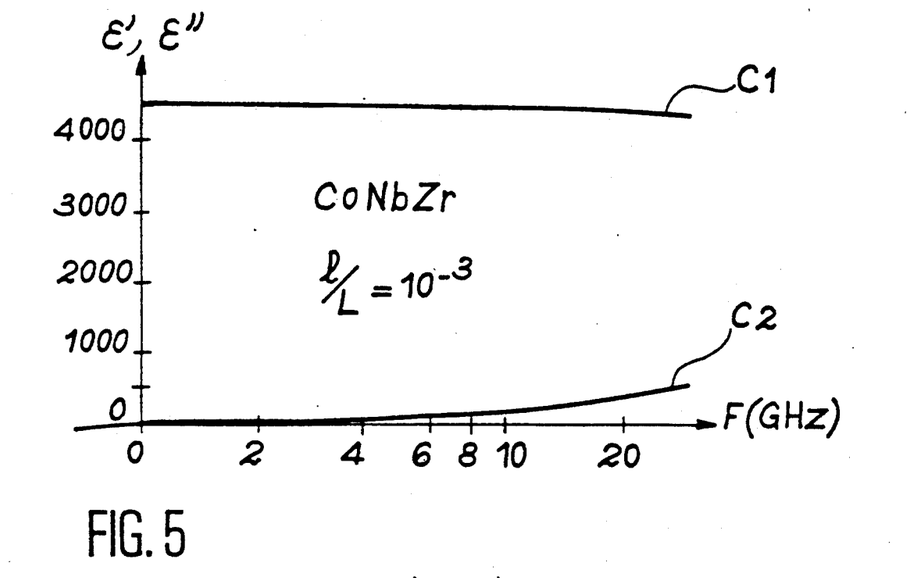
FIG. 5—The variations of the real $\epsilon'$ and imaginary $\epsilon''$ electrical permitivities of a film of $Co_{87}Nb_{11.5}Zr_{1.5}$ cut into blocks according to the invention with a thickness of 200 nm, as a function of the frequency F of an electromagnetic field applied to said film.

This can be clearly gathered from FIG. 5, which gives the variations of the electrical permitivity of a material according to the invention made from $Co_{87}Nb_{11.5}Zr_{1.5}$ with ι/L = $10^{-3}$, as a function of the frequency of an exciting electromagnetic field. Curve $C_1$ gives the variations of the real electrical permitivity ε' and curve $C_2$ the variations of the imaginary electrical permitivity ε".

With reference to FIGS. 6a to 6e, an example of the production of a composite material according to the invention will now be given.

Figure 6A:
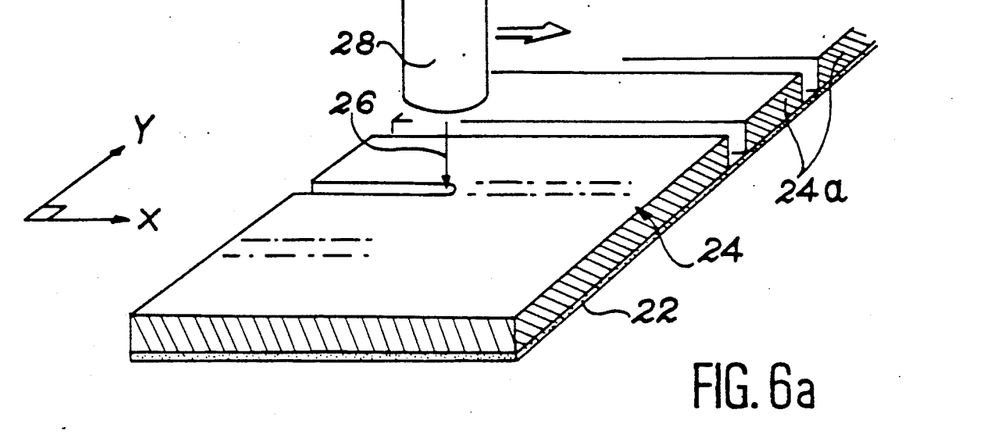
FIGS. 6a to 6e—Diagrammatically and in perspective view, the different stages of producing a composite material according to the invention.

The first stage of the process, as shown in FIG. 6a, consists of depositing on a 10 nm $SiO_2$ first insulating film 22 a first 200 nm $Co_{87}Nb_yZr_z$ continuous film 24 with y+z=13. Film 24 is deposited by cathodic sputtering on the basis of the evaporation of a solid cobalt target on which are deposited niobium and zirconium sheets, whereof the surface is adjusted as a function of the composition of the material of film 24 which it is wished to obtain.

A deposition rate of 8.5 nm/min for film 24 can be obtained in a deposition enclosure in which there is an initial vacuum below $10^{-6}$ Torr ($10^{-8}$ Pa), in which circulates argon at a pressure of $2.5 \cdot 10^{-3}$ Torr ($3 \cdot 10^{-5}$ Pa) and in which the radio frequency power used is 500 W.

Using a laser beam 26 emitted by a source 28 and moving in direction X, magnetic strips 24a parallel to one another and to direction X are cut from film 24. These strips 24a have a width of 1000 μm, i.e. at least 10 times less than their length, and are spaced by 10 μm.

Figure 6B:
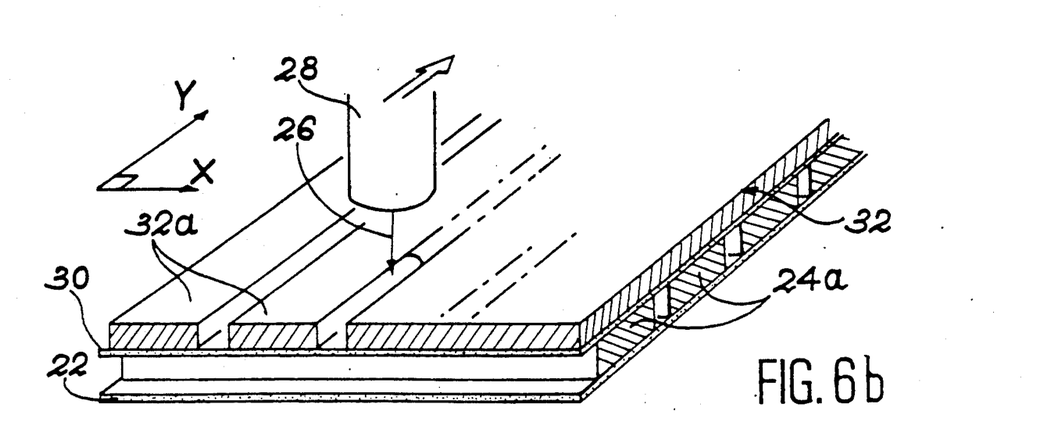

As shown in FIG. 6b, this is followed by the deposition of a second approximately 10 nm thick insulating film 30, which is in particular of $SiO_2$ deposited by chemical vapor phase deposition (CVD). Insulating film 30 is then covered with a second 200 nm thick amorphous magnetic material film 32, which is deposited by cathodic sputtering and is of composition $Co_{87}Nb_{11.5}Zr_{1.5}$.

Figure 6C:
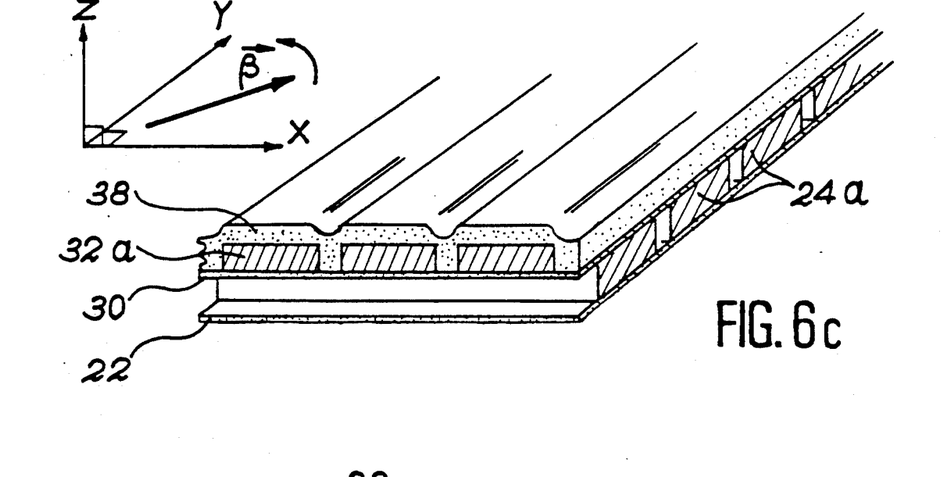
Figure 6D:
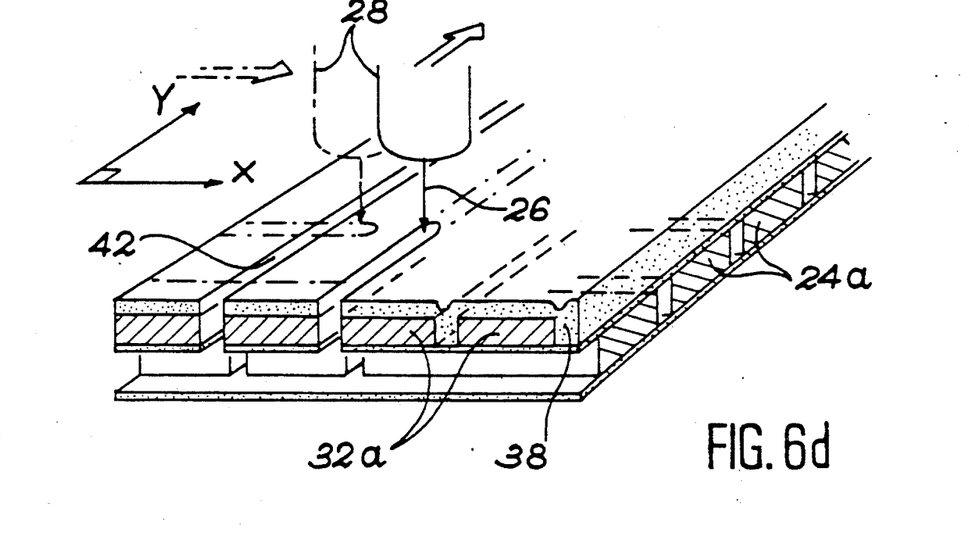
Figure 6E:
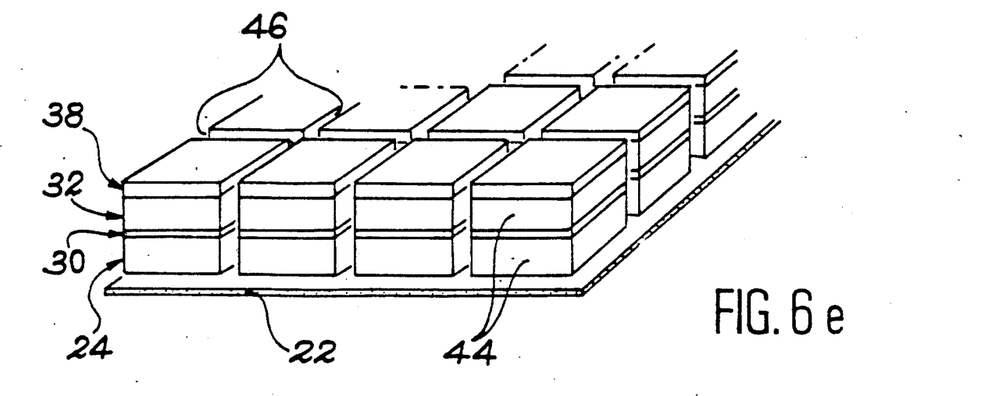

Using laser beam 26 moving in direction Y perpendicular to direction X, magnetic strips 32 parallel to Y and 1000 μm wide, separated by 10 μm and at least 10 times longer than wide are cut from film 32. Following said laser cutting, a third 10 nm thick insulating film 38 is deposited. This insulating film is in particular a CVD-deposited SiO2 film. The structure obtained is as shown in FIG. 6c.

The process continues by depositing a third CoNbZr film, which is cut to form magnetic strips parallel to X. This is followed by the deposition of a third insulating film, followed by the deposition of a fourth magnetic material film in which is formed, by laser cutting, magnetic strips parallel to direction Y. A fifth insulating film is then deposited and so on until a stack of films with the desired thickness is obtained, this being a function of the envisaged application of the material.

When the stack of magnetic and insulating films is completed, a heat treatment takes place on the sample in the presence of a rotary magnetic field $\vec{B}$ oriented in plane XY, i.e. in the plane of the magnetic and insulating films. The intensity of the magnetic field $\vec{B}$ is approximately 70 kA/m and the heat treatment consists of heating the sample to a temperature of approximately 230° C.

This heat treatment under a rotary magnetic field makes it possible to orient the dipole moments of the atoms constituting the different magnetic strips, such as 24a and 32a, in the lengthwise direction of said strips. In other words, the magnetic moment of the atoms forming strips 32a is oriented parallel to direction Y and the magnetic moment of the atoms of the strips 24a is oriented parallel to direction X.

Using the same laser cutting process and over the entire length of the stack of magnetic and insulating films, trenches 42 are then made in accordance with two directions X and Y. Cutting can take place over the entire thickness of the stack, or can stop at the last insulating film, corresponding in the present case to film 22, if it is wished for the latter film to constitute the cohesion support of the composite material according to the invention.

The trenches are 10 μm wide and spaced by 1000 μm and do not necessarily coincide with the cut lines X and Y of strips 24a and 32a. The composite material obtained has the structure shown in FIG. 6e, which is close to that illustrated in FIG. 2. References 44 and 46 respectively represent the magnetic blocks and the insulating joints.

The obtention of a composite material according to the invention, as shown in FIG. 1, is comparable to that described relative to FIGS. 6a to 6e, except that the deposition of each amorphous magnetic material film is followed by etching, leading to the formation of magnetic blocks 6 instead of strips parallel to X or Y.

In this embodiment, the orientation of the magnetic moments of the blocks must take place film by film, i.e. just after the deposition of each insulating film. This admittedly complicates the process somewhat. In addition, the realization on the basis of alternately crossing strips X, Y with the cutting of trenches throughout the stack of films is given preference.

Obviously, insulating joints in the form of air layers can also be obtained by methods other than laser cutting, such as photolithography using dry etching (chlorine or fluorine-containing gases) or wet etching (solution based on hydrofluoric and nitric acids), electron beam cutting or mechanical cutting.

In order to obtain insulating joints between the magnetic blocks in something other than air, it is possible to carry out an oxidation in the mass of the magnetic material leading to the formation of mixed oxide joints based on Co, Nb and/or Zr. This oxidation in the mass can be carried out chemically or by oxygen ion implantation.

Figure 7A:
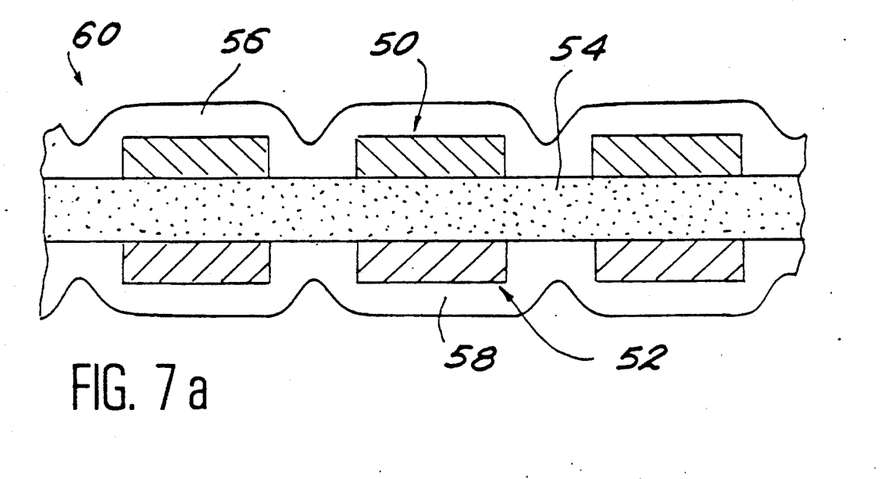

When it is wished to cover an awkward surface, it is desirable for the composite material to be flexible. Under such conditions and as shown in FIG. 7a, there is a deposition of a film 50 and a film 52 of magnetic material on either side of a flexible insulating support 54, followed by cutting films 50 and 52 into blocks in the manner described hereinbefore. This is followed by the deposition of two insulating films 56, 58 respectively on films 50 and 52, in order to insulate the blocks from one another. The assembly of films obtained in this way carries the reference 60.

Figure 7B:
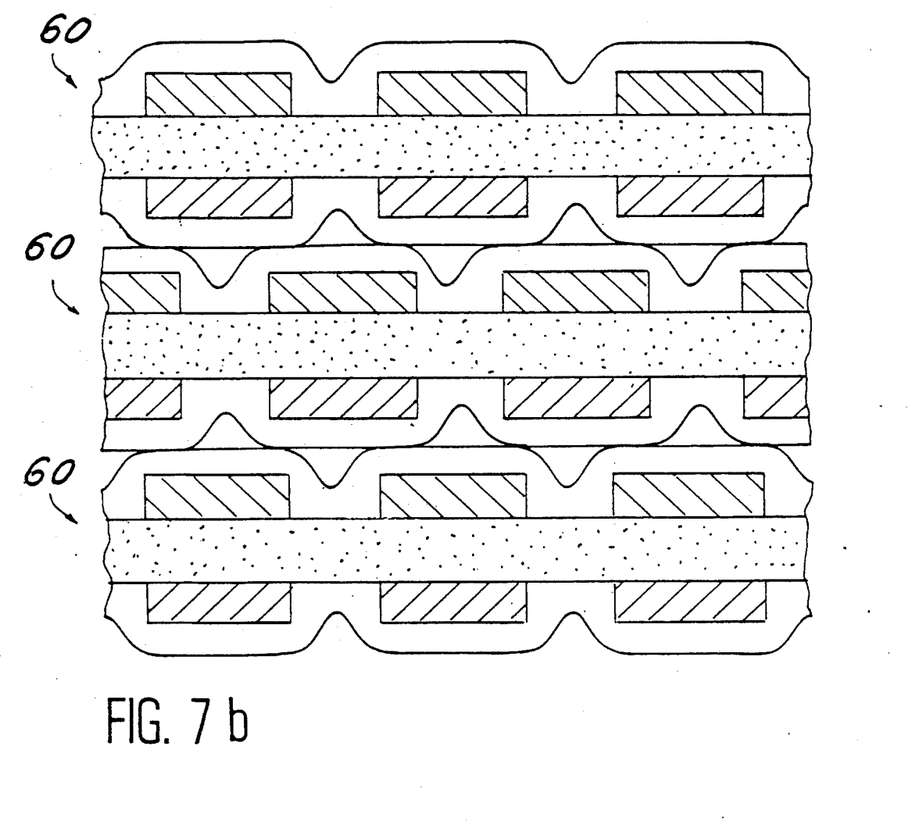

It is then merely necessary to stack said assembly 60 n times, as shown in FIG. 7b, in order to bring about a satisfactory, flexible stack making it possible to cover all awkward surface. The orientation of the magnetic moments is then carried out in the manner described hereinbefore.

The insulating support 54 can be a polyimide film, such as a KAPTON sheet supplied by Dupont de Nemours or a polyester layer, such as a MYLAR sheet supplied by Dupont de Nemour (ethylene glycol+-terephthalic acid). This also applies regarding insulating films 56 and 58.

The composite material according to the invention has the advantage of small overall dimensions (thickness less than 1 mm), a surface density below 1 kg/m² (approximately 0.5 kg/m²) and of being usable in a wide frequency range between 50 MHz and a few GHz. Unlike the prior art materials, this makes it possible to use the inventive material in a broader range of applications.

We claim:

1. Composite magnetic material, comprising an alternation of magnetic material films (2) and electrically insulating materials (4), each magnetic material film (2) being formed by several magnetic blocks (6) separated from one another by electrically insulating joints (8, 8a), the total volume Vp occupied by the blocks and the total volume Vj occupied by the joints and the insulating films being such that the ratio Vp/Vj varies from 10 to 50.

2. Composite material according to claim 1, wherein the magnetic material is an amorphous ferromagnetic material having a magnetic permeability at least three times greater than soft iron.

3. Composite material according to claim 1, wherein the magnetic material is an alloy of cobalt and at least one element chosen from among zirconium and niobium.

4. Composite material according to claim 1, wherein the magnetic material is of formula $Co_xNb_yZr_z$ with $80 \leq x \leq 95$ and $y+z=100-x$.

5. Composite material according to claim 1, wherein the magnetic material is of formula $Co_{87}Nb_{11.5}Zr_{1.5}$.

6. Composite material according to claim 1, wherein the magnetic films (2) have magnetic moments oriented in the same direction parallel to the plane (X, Y) of the films.

7. Composite material according to claim 1, wherein the magnetic films (2) have a thickness between 200 and 400 nm.

8. Composite material according to claim 1, wherein the insulating films (4) have a thickness between 10 nm and 10 μm.

9. Composite material according to claim 1, wherein the insulating joints (8a) are constituted by an air layer or an oxide layer.

10. Composite material according to claim 1, wherein a continuous support (12) is provided as the final film of said composite material.

11. Composite material according to claim 1, wherein the insulating joint has a length value $\iota$ and the magnetic block has a side value L, the ratio of $\iota/L$ varying from $10^{-2}$ to $10^{-4}$.

* * * * *

UNITED STATES PATENT AND TRADEMARK OFFICE
CERTIFICATE OF CORRECTION

PATENT NO. : 5,047,296

DATED : September 8, 1988

INVENTOR(S) : Bernard Miltenberger et al.

It is certified that error appears in the above-identified patent and that said Letters Patent is hereby corrected as shown below:

```
Column 8, line 38, "materials" should read --material
films--.
```

Signed and Sealed this

Twenty-fifth Day of May, 1993

Attest:

MICHAEL K. KIRK

Attesting Officer

Acting Commissioner of Patents and Trademarks